A. MacKINNON.
MOLD FOR MAKING CORK BOARDS.
APPLICATION FILED JULY 22, 1913.

1,121,263.

Patented Dec. 15, 1914.
3 SHEETS—SHEET 1.

WITNESSES
Geo. Bambay.
C. Bradway

INVENTOR
Archibald MacKinnon
BY Munn & Co
ATTORNEYS

A. MacKINNON.
MOLD FOR MAKING CORK BOARDS.
APPLICATION FILED JULY 22, 1913.
1,121,263.
Patented Dec. 15, 1914.
3 SHEETS—SHEET 2.
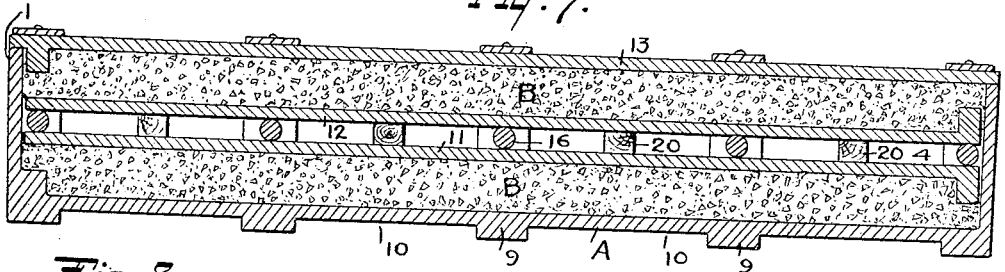
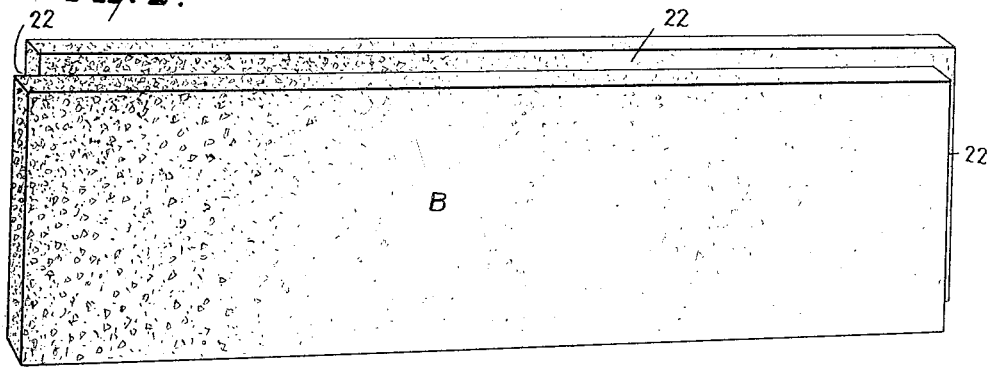
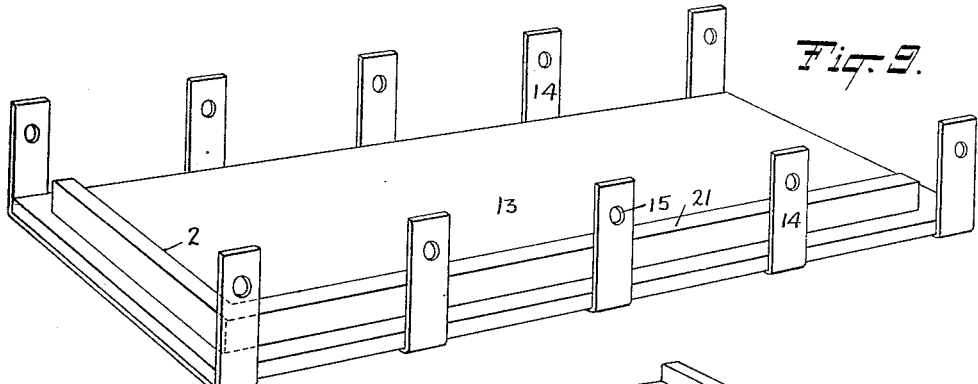
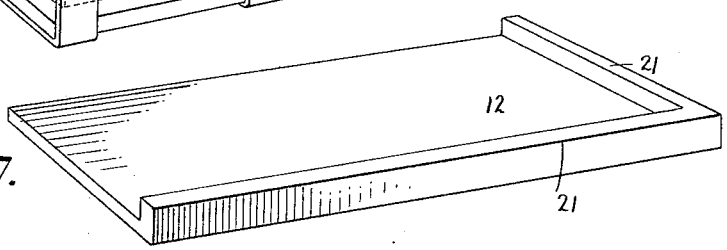
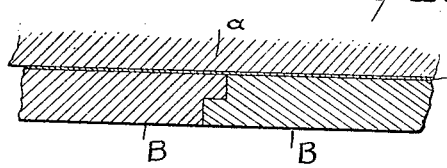
WITNESSES
Geo. Bambay.
C. Bradway.
INVENTOR
Archibald MacKinnon
BY
ATTORNEYS

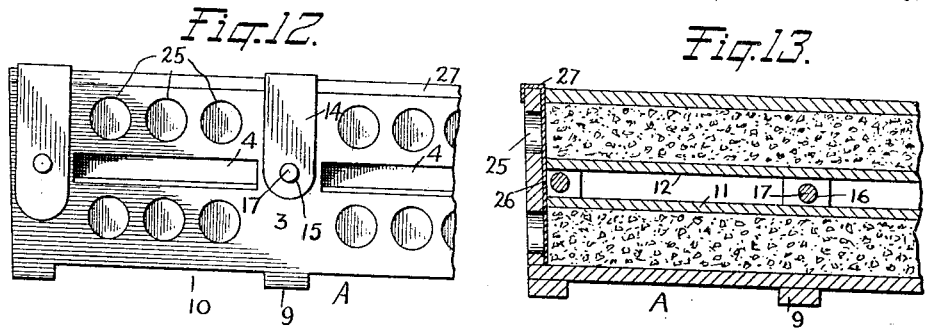
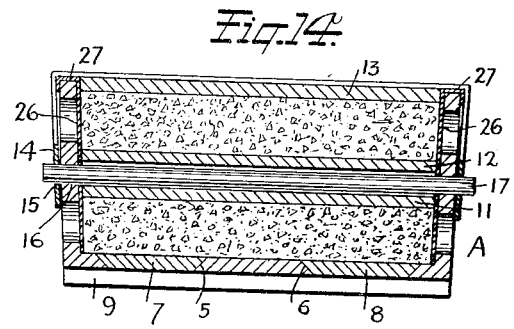
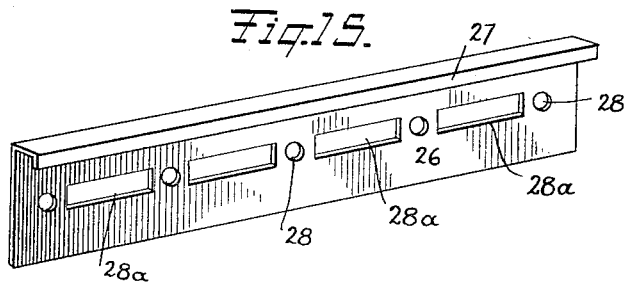
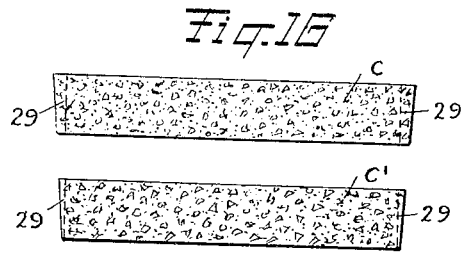

UNITED STATES PATENT OFFICE.

ARCHIBALD MacKINNON, OF TUCKAHOE, NEW YORK.

MOLD FOR MAKING CORK-BOARDS.

1,121,263.  Specification of Letters Patent.  Patented Dec. 15, 1914.

Application filed July 22, 1913. Serial No. 780,475.

*To all whom it may concern:*

Be it known that I, ARCHIBALD MACKINNON, a subject of the King of Great Britain, and a resident of Tuckahoe, Marbledale, in the county of Westchester and State of New York, have invented a new and Improved Mold for Making Cork-Boards, of which the following is a full, clear, and exact description.

This invention relates to a mold box designed especially for holding ground or granulated cork under compression while baking the same to form compressed cork board.

The general objects of the invention are to improve the construction of mold devices of the character referred to so as to be reliable and efficient in use, of greater capacity than mold boxes heretofore in use, and so designed that the removal of the finished boards is accomplished with facility.

A further object of the invention is the provision of a mold box of novel construction whereby a plurality of boards can be molded and baked simultaneously in a single mold, while at the same time producing a superior article.

Still another object of the invention is the employment of a plurality of removable plates adapted to be so positioned in the mold box as to provide a plurality of mold chambers separated by an air space so that the baking of two or more slabs can be readily accomplished, said plates and bottom of the mold being so formed as to mold the cork boards with rabbets, whereby the boards when laid will have overlapping joints. In this connection it may be said that at the present time cork boards must be laid in two courses, with the boards of one course overlapping the joints between the boards of the other course. With boards made in the mold herein referred to one layer or course of boards is sufficient to provide an insulating facing for walls, ceiling and floors.

With these objects in view, and others as will appear as the description proceeds, the invention comprises various novel features of construction and arrangement of parts which will be more fully described hereinafter and set forth with particularity in the claims appended hereto.

Figure 1:
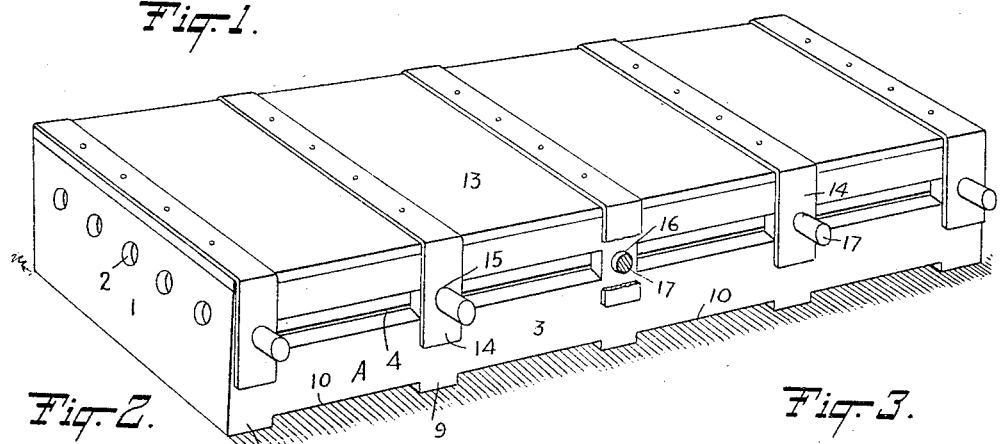
Figure 2:
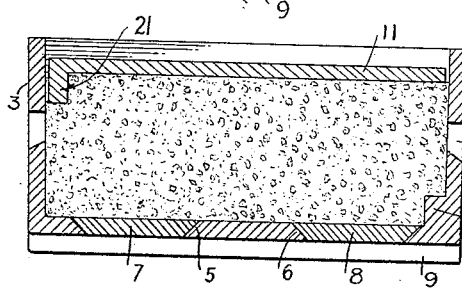
Figure 3:
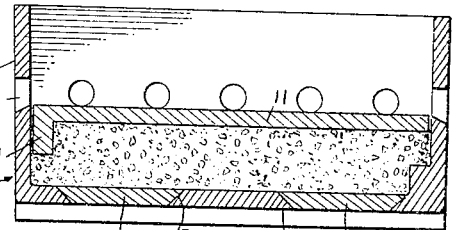
Figure 4:
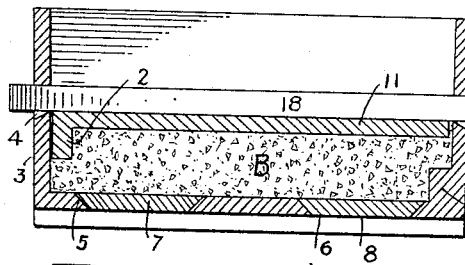
Figure 5:
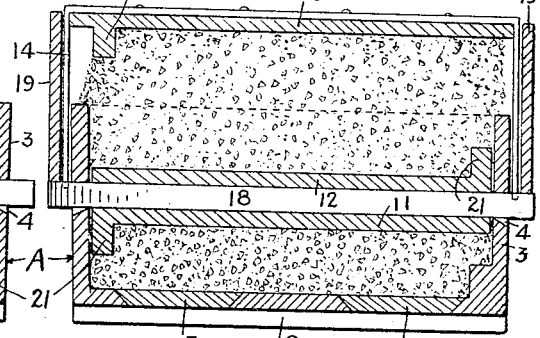
Figure 6:
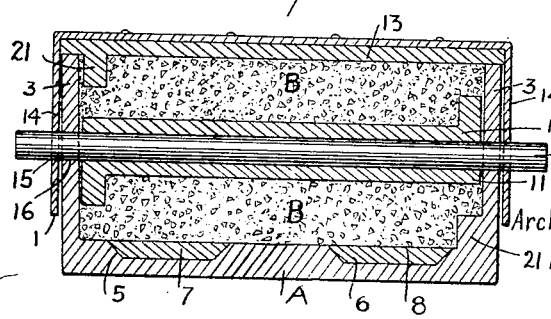

In the accompanying drawings, which illustrate certain embodiments of the invention, and wherein similar reference characters are employed to designate corresponding parts throughout the several views, Figure 1 is a perspective view of the mold with its parts clamped together and ready for the baking of the compressed boards of cork therein; Fig. 2 is a transverse section of the mold box with the cork for the first board slightly compressed; Fig. 3 is a similar view showing the first board compressed; Fig. 4 is a view similar to Fig. 3 with the temporary holding or clamping bars in position; Fig. 5 is a sectional view showing the charge of cork for the second board of the mold box preparatory to compression; Fig. 6 is a transverse section of the closed mold box with both boards compressed and ready for baking; Fig. 7 is a longitudinal section of Fig. 1; Fig. 8 is a perspective view of the finished cork board; Fig. 9 is an inverted perspective view of the top plate of the mold box; Fig. 10 is a perspective view of one of the inner mold plates; Fig. 11 is a sectional view of a wall having an insulating facing formed by the cork boards produced in the mold box; Figs. 12 and 13 are fragmentary side and longitudinal sectional views of a modified form of mold box used for molding unrabbeted boards; Fig. 14 is a transverse section of the mold shown in Fig. 12; Fig. 15 is a perspective view of one of the removable lining plates or sections for the modified form of mold box; and Fig. 16 is an end view of the two cork boards made by the mold shown in Fig. 12.

Referring to the drawings, A designates a cast iron, steel or other metal box which is formed with end walls 1 provided with perforations 2 and with side walls 3 provided with slots 4, the said slots and perforations being so located as to communicate with the space between the two mold chambers in the box, so that heated air can freely circulate through the mold box. The bottom of the mold box as shown in Figs. 2 to 6 inclusive has longitudinal slots 5 and 6 that are filled with slats 7 and 8 respectively, the edges of the slots and slats being beveled so that the slats will drop out of the bottom when the mold box is inverted for the purpose of removing the molded boards. The removal of the molded boards is facilitated by the end and side walls being flared upwardly at a slight angle. To enable a free circulation under the mold box the bottom thereof is formed with transverse ribs 9 to provide channels 10 extending from one side of the mold box to the other to form the mold chambers. Removable plates 11 and 12 are placed in the mold box, the said plate 11 forming the top of the lower mold chamber and the plate 12 forming the bottom of the upper mold chamber, while a top plate 13 forms the top of the upper chamber. The top plate has depending ears 14 which are provided with apertures 15 that are adapted to register with apertures 16 in the portions of the side walls 3 at the ends of the slots 4. By means of these apertures locking pins or bars 17 can be inserted through the lugs 14 and through the walls 3, the pins being long enough to extend transversely through the mold box from one side to the other so as to form means for holding the plate 11 down and to support the plate 12, as it will be understood that considerable pressure is exerted on these plates by the tension of a compressed cork within the mold box.

In using the mold the box with the slats 7 and 8 therein is supplied with a suitable quantity of granulated cork and then the plate 11 is placed on top of the cork. A plunger of a hydraulic or other press is next brought against the plate 11 to force the latter downwardly into the mold box, as shown in Fig. 1, until the said plate is in the position shown in Fig. 3, the top edge of the plate being even with the bottoms of the slots 4 in the side walls 3. Temporary restraining bars 18 are placed transversely in the mold box through the slots 4, as shown in Fig. 4, said bars serving not only to hold the plate 11 down but also to form supporting means for the plate 12. A rectangular frame or holder 19 is now placed around the mold box and if desired supported on the projecting ends of the restraining bars 18, as shown in Fig. 5. This extends the capacity of the mold box so that the proper quantity of cork for the upper board can be supplied. The top plate 13 is next positioned on the pile of cork and then the press forces the top plate downwardly as far as it will go. By this time the apertures 15 in the lugs 14 will register with the apertures 16 in the side walls 3, so that the locking pins or elements 17 can be inserted as shown in Fig. 6. The restraining bars 18 can now be taken out, and, if desired, small blocks 20 of wood may be inserted as shown in Fig. 7, between the plates 11 and 12 at points between the pins 17, so as to prevent the plates from bulging under the internal pressure in the mold chambers. The closed mold box is now placed in an oven and subjected to the required temperature to bake the cork. The blocks of wood 20 of course burn during the baking operation but at the same time the internal pressure decreases so that need of the blocks no longer exists.

When a rabbeted board or panel B, such as is shown in Fig. 8, is desired, the bottom of the mold box on the inside and the plates 11, 12 and 13 will be formed with flanges 21, such flanges forming the rabbets 22 at the four edges of the cork boards.

In Fig. 11 is shown a section of a wall $a$ having an insulating facing formed of cork boards B, such boards being secured to the wall by a suitable waterproof cement or other adhesive $b$. The cork boards are so laid that the rabbets will interlock and form a tight joint.

For making extra thick boards a mold such as is shown in Figs. 12 to 15 is preferably employed. The box itself is of substantially the same construction as the box shown in Fig. 1, and hence corresponding parts are similarly numbered but the end and side walls 1 and 3 are provided with large openings 25 so that the heat can readily obtain access to the cork within the mold. These openings are covered by sheet metal lining plates or sections 26 which are held in place on the ends and side walls of the mold box by L-shaped flanges 27 that hook over the upper edges of such walls. These plates will readily drop out of the mold when the same is inverted for the removal of the compressed and baked cork boards. The plates 26 for the sides of the mold box are provided with apertures 28, Figs. 14 and 15, for permitting the locking elements 17 to be placed in the mold box, and these plates also have slots $28^a$ that register with the slots 4 in the side walls 3 of the mold box, so that a heating medium can circulate through the latter. In removing the molded boards the pins 17 are taken out and the top plate 13 lifted off. The mold is then turned upside down, and it is only necessary to tap on the slats 7 and 8 to effect the removal of the finished cork boards. With other mold boxes it is extremely difficult to remove the cork board and a great deal of time is wasted thereby, and, furthermore, the operation is very trying on the workmen. These difficulties, however, are successfully overcome by the present mold box. It will be observed that by reason of the flaring of the oppositely-disposed walls of the mold the upper board $c$ is wider than the lower board $c'$. This difference is exaggerated in Fig. 16, and by reason of the difference in dimensions the end and side edges of the cork boards will be dressed along the lines 29, so that both boards will be of the same dimensions.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made when desired as are within the scope of the appended claims.

Having thus described my invention, I claim as new and desire to secure by Letters Patent:

1. A mold for making cork boards comprising a mold box made as a single piece structure, plates removably mounted therein and dividing the box into chambers separated by a heating space, the walls of the box having openings for permitting circulation of a heating medium through the said space, and a top plate for closing the mold.

2. A mold for making cork boards comprising a single mold box, plates removably mounted therein and dividing the box into chambers separated by a heating space, the walls of the box having openings for permitting circulation of a heating medium through the said space, a top plate for closing the mold, the bottom of the mold being formed with openings, and slats filling the said openings.

3. A mold for making cork board comprising a mold box having apertures in its walls, a plurality of plates in the mold box for dividing the same into chambers, a top plate for closing the upper chamber, and elements passing through the mold box between the plates therein for holding the latter spaced apart, and also connected with the top plate for holding the latter in position.

4. A mold for making cork board comprising a mold box and having its walls provided with apertures, a plate in the mold box for holding cork compressed therein, devices extending into the box and holding the said plate down, another plate in the box and resting on the said devices, a top plate for closing the top of the box and holding cork compressed therein, and means on the top plate engaged with the said devices, said devices maintaining the first and second-mentioned plates spaced apart to form a heating space in which a heating medium circulates in the apertures in the walls of the box.

5. A baking mold for making cork boards comprising a mold box having its walls provided with apertures to expose the cork to heat, sheet metal lining elements covering the apertures in the said walls and removably engaged with the latter, said elements being thin to transmit heat to the cork and capable of withstanding the pressure to which the cork is subjected, and a plate for holding cork compressed in the mold box.

6. A mold for making cork boards comprising a mold box having apertured walls, sheet metal lining elements covering the apertures in the said walls and removably engaged with the latter, a plate for holding cork compressed in the mold box, the bottom of the mold being formed with slots having edges that are beveled downwardly, and slats having oppositely beveled edges and removably positioned in the slots of the bottom.

7. A mold for making cork board comprising a mold box having openings in its walls, a pair of plates in the said box for dividing the same into upper and lower mold chambers, a top plate having depending lugs, lining sections facing the inner surfaces of the walls of the mold box to cover the apertures thereof, and elements passing through the side walls of the box and lining sections therefor and between the first mentioned plates and engaged with the said lugs for locking the movable parts of the mold to the mold box during the baking of the contents of the chambers of the mold box.

In testimony whereof I have signed my name to this specification in the presence of two subscribing witnesses.

ARCHIBALD MacKINNON.

Witnesses:
  CHATTEN BRODWAY,
  PHILIP D. ROLLHAUS.